G. L. GREGORY.
HEADER.
APPLICATION FILED OCT. 9, 1908.
929,642.
Patented July 27, 1909.
2 SHEETS—SHEET 1.
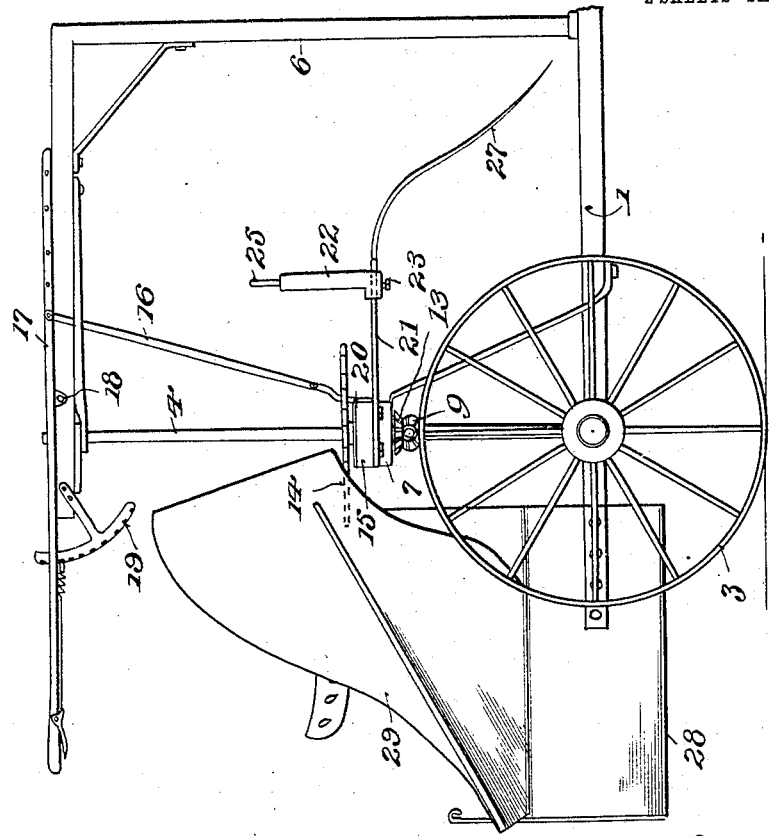
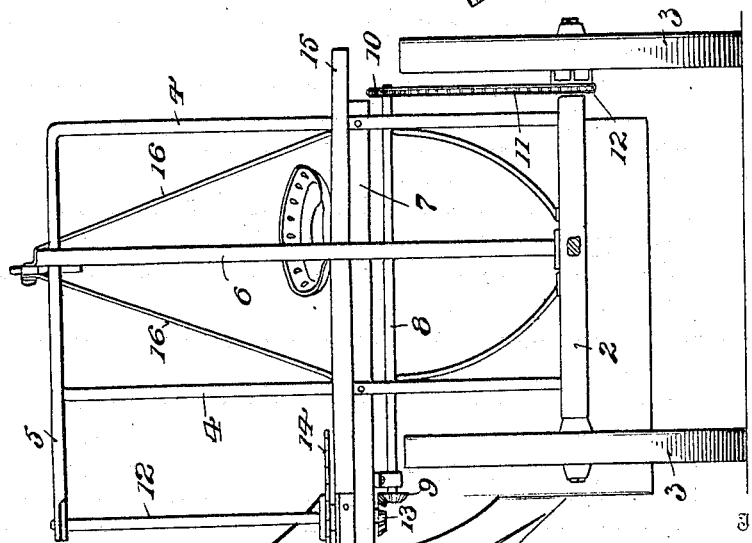
Inventor
G. L. Gregory

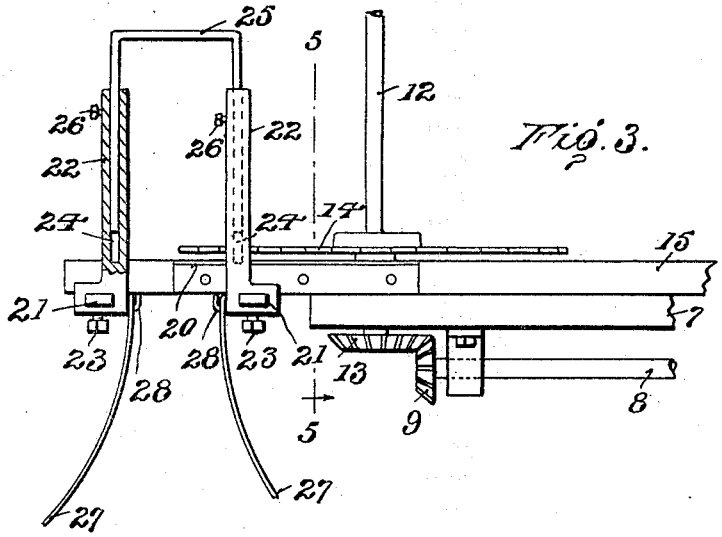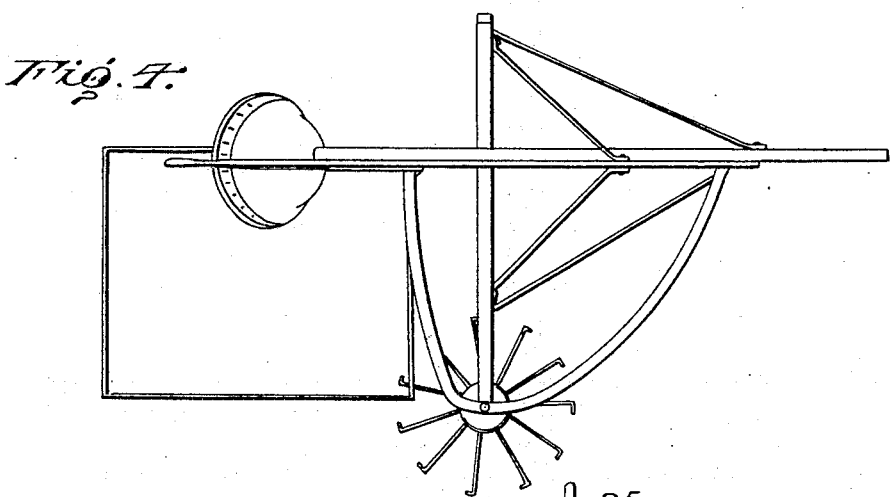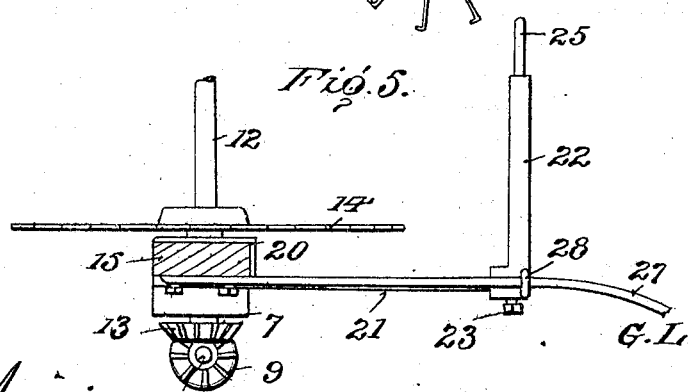

UNITED STATES PATENT OFFICE.

GEORGE L. GREGORY, OF MERKEL, TEXAS, ASSIGNOR OF ONE-HALF TO W. A. SCOTT AND ONE-FOURTH TO OTTO CARTER, OF MERKEL, TEXAS.

HEADER.

No. 929,642.     Specification of Letters Patent.     Patented July 27, 1909.

Application filed October 9, 1908. Serial No. 456,927.

*To all whom it may concern:*

Be it known that I, GEORGE L. GREGORY, a citizen of the United States, residing at Merkel, in the county of Taylor and State of Texas, have invented certain new and useful Improvements in Headers, of which the following is a specification.

The present invention has for its object to provide a novel machine for heading grain and which is readily adjustable to adapt the same to grain of different heights and which is at all times under control of the operator.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a front view of a machine embodying the invention. Fig. 2 is a side view thereof. Fig. 3 is a front view of the cutting mechanism, the guard, their mountings thereof and operating gearing for the cutting mechanism, showing the parts on a larger scale. Fig. 4 is a top plan view of the reel and support therefor, and Fig. 5 is a section on the line 5—5 of Fig. 3, looking to the right, as indicated by the arrow.

Corresponding and like parts are referred to in the following description and indicated in all the views of the drawings by the same reference characters.

The main frame 1 is mounted upon an axle 2 which is provided with supporting wheels 3, one of which constitutes a driver for operating the reel by means of which the tops of the grain are forced over the cutter. An upright frame 4 is connected at its lower end to the axle or main frame and is provided with a lateral extension 5. A stay frame 6 connects the upper portion of the frame 4 with the front portion of the main frame 1 and comprises a vertical member and a horizontal member. A transverse beam 7 is connected to the uprights of the frame 4 and supports a transverse shaft 8 which is provided at one end with a bevel gear 9 and at its opposite end with a sprocket gear 10, a sprocket chain 11 connecting the sprocket gear 10 with a sprocket gear 12 connected to the drive wheel 3 so as to receive power therefrom. A vertical shaft 12 is mounted in the extension 5 of the upright frame 4 and in the beam 7 and is provided at its lower end with a bevel gear 13 which is in mesh with the bevel gear 9. A reel 14 is mounted upon the vertical shaft 12 and is keyed thereto so as to rotate therewith.

A frame comprising a transverse beam 15 and braces 16 is mounted for vertical adjustment upon the upright frame 4 and vertical shaft 12 and is provided with the reel 14, the cutting mechanism and the guard for directing the grain to the cutting mechanism. The braces 16 are upwardly converged and are attached at their upper ends to a lever 17 which is fulcrumed at 18 upon the horizontal member of the stay frame 6, said lever being provided with the usual hand latch to coöperate with a notched segment 19 to hold the lever and frame at the required adjusted position. The cutting blade 20 is fast to the end portion of the beam 15 and is located directly beneath the outer portion of the reel 14. The beam 15 projects beyond the beam 7 and the projecting end carries the guard by means of which the grain is directed to the cutting mechanism.

Parallel bars 21 are attached at their rear ends to the beam 15 and project forward therefrom. Standards 22 are adjustable upon the bars 21 and are provided at their lower ends with widened portions which are apertured to receive the said bars 21, set screws 23 being threaded into openings leading from the apertures formed in the widened ends and serving to secure the standards 22 in the adjusted position. Vertical openings 24 are formed in the standards 22 and receive the legs of a substantially U-shaped frame 25, the latter being secured in the standards in an adjusted position by means of set screws 26. The standards 22 may be moved along the bars 21 and held in the required position by means of the set screws 23. The frame 25 is adjustable vertically to regulate the distance between its cross bar and the cutter blade 20 according to the length of the head of grain, so that a minimum amount of stalk may be left upon the head of grain when cut.

Guards 27 extend forwardly and downwardly from the bars 21 and consist of rods which are made fast at their rear ends to the beam 15 and extend forwardly parallel with the bars 21 and are supported in hooks 28 provided at the lower ends of the standards 22 and preferably constitute a part thereof. The end portions of the rods extending in front of the bars 21, curve downwardly and outwardly so as to gather in leaning or fallen grain and lift and direct the same to the cutter. It is observed that the gathering and cutting mechanisms are located at one side of the machine so as not to permit the horses to trample down the grain when drawing the machine over the field.

A box 28 is located in the rear of the cutting mechanism to receive the heads of grain as the latter are cut. A deflector 29 is attached to one side of the box so as to insure delivery of the heads of grain therein as they are cut from the stalks.

Having thus described the invention, what is claimed as new is:

1. In a machine of the character specified the combination of an axle provided with supporting wheels, a main frame mounted upon said axle, an upright frame comprising vertical members and a cross piece, a transverse beam connected to the vertical members of said upright frame, a transverse shaft mounted in bearings applied to said transverse beam, means connecting one end of said shaft to one of the supporting wheels, a vertical shaft mounted in said transverse beam and in the cross piece of the upright frame and geared to the opposite end of said transverse shaft, a reel mounted upon the vertical shaft, a second transverse beam mounted upon the vertical members of the upright frame and adjustable thereon and carrying the said reel, means for vertically adjusting the second transverse beam and securing the same in an adjusted position, horizontal bars secured to said second transverse beam, standards slidably mounted on the horizontal bars, a substantially U-shaped frame carried by and adjustable vertically of the standards, and cutting and gathering mechanisms mounted upon an extension of the second transverse beam and movable vertically therewith.

2. In a machine of the character set forth the combination of horizontal parallel bars, standards having openings in their upper ends and having their lower ends widened and provided with openings to receive said parallel bars, set screws threaded into openings formed in the widened ends of the standards to secure them to the parallel bars in an adjusted position, a U-shaped frame having its members inserted in the openings in the upper ends of said standards, guards extended forward of the bars, and cutting mechanism at the rear ends of said bars.

3. In a machine of the character set forth the combination of horizontal parallel bars, standards having openings in their upper ends and having their lower ends widened and provided with openings to receive said parallel bars, set screws threaded into openings formed in the widened ends of the standards to secure them to the parallel bars in an adjusted position, a U-shaped frame having its members inserted in the openings in the upper ends of said standards, guards extended forwardly and downwardly from the aforesaid parallel bars, and means for connecting said guards to the lower ends of the standards.

4. In a machine of the character specified the combination of a transverse beam, parallel bars connected to said transverse beam, standards adjustable upon said parallel bars, a U-shaped frame connecting the upper ends of said standards and adjustable with reference thereto, guards connected to the transverse beam and extended forwardly thence downwardly, and means connecting said guards to the lower ends of said standard.

In testimony whereof I affix my signature in presence of two witnesses.

GEORGE L. GREGORY. [L. S.]

Witnesses:
R. E. DILLARD,
L. D. GAITHER.